(12) United States Patent
Cooper

(10) Patent No.: US 9,432,555 B2
(45) Date of Patent: Aug. 30, 2016

(54) SYSTEM AND METHOD FOR AV SYNC CORRECTION BY REMOTE SENSING

(71) Applicant: J. Carl Cooper, Los Gatos, CA (US)

(72) Inventor: J. Carl Cooper, Los Gatos, CA (US)

(*) Notice: Subject to any disclaimer, the term of this patent is extended or adjusted under 35 U.S.C. 154(b) by 10 days.

(21) Appl. No.: 14/460,305

(22) Filed: Aug. 14, 2014

(65) Prior Publication Data

US 2014/0354829 A1  Dec. 4, 2014

Related U.S. Application Data

(63) Continuation-in-part of application No. 11/598,870, filed on Nov. 13, 2006, which is a continuation-in-part of application No. PCT/US2005/041623, filed on Nov. 16, 2005, which is a continuation-in-part of application No. PCT/US2005/012588, filed on Apr. 13, 2005, which is a continuation of application No. 10/846,133, filed on May 14, 2004, now Pat. No. 7,499,104.

(60) Provisional application No. 60/471,176, filed on May 16, 2003, provisional application No. 61/865,901, filed on Aug. 14, 2013.

(51) Int. Cl.
| | |
|---|---|
| *H04N 9/475* | (2006.01) |
| *H04N 5/04* | (2006.01) |
| *H04N 17/00* | (2006.01) |
| *H04N 21/2368* | (2011.01) |
| *H04N 21/434* | (2011.01) |
| *H04N 21/44* | (2011.01) |
| *H04N 21/422* | (2011.01) |
| *H04N 21/43* | (2011.01) |
| *G10L 15/00* | (2013.01) |
| *H04R 3/00* | (2006.01) |
| *H04R 27/00* | (2006.01) |

(52) U.S. Cl.
CPC .............. *H04N 5/04* (2013.01); *G10L 15/00* (2013.01); *H04N 17/00* (2013.01); *H04N 21/2368* (2013.01); *H04N 21/42222* (2013.01); *H04N 21/4307* (2013.01); *H04N 21/4341* (2013.01); *H04N 21/44008* (2013.01); *H04R 3/00* (2013.01); *H04R 27/00* (2013.01); *H04R 2499/11* (2013.01); *H04R 2499/15* (2013.01)

(58) Field of Classification Search
CPC .... H04N 5/04; H04N 17/00; H04N 21/2368; H04N 21/4341; H04N 21/44008; H04N 21/42222; H04N 21/4307; G10L 15/00; H04R 3/00; H04R 27/00; H04R 2499/11; H04R 2499/15
USPC ....... 348/515, 512, 441, 461, 480, 516–518, 348/519, 571, 575, 722, 738, 699–700, 348/576; 382/118, 190
IPC ...................................................... H04N 9/475
See application file for complete search history.

(56) References Cited

U.S. PATENT DOCUMENTS

| | | | | |
|---|---|---|---|---|
| 5,387,943 | A * | 2/1995 | Silver ...................... | H04N 5/04 348/512 |
| 7,212,248 | B2 * | 5/2007 | Stanger .................... | H04N 5/04 348/423.1 |
| 8,665,320 | B2 * | 3/2014 | Holley .................... | H04N 17/04 348/53 |
| 2010/0124403 | A1 * | 5/2010 | Thornburg ............... | H04N 5/95 386/207 |

* cited by examiner

*Primary Examiner* — Trang U Tran

(57) ABSTRACT

Method and system for measuring audio video synchronization. This is done by having a remote sensing station to measure and process the audio and images from a multimedia terminal that display a television program. The remote sensing station uses an audio sensor to sense the audio signal from the multimedia station and an image sensor to sense the images displayed on the multimedia station. An AV processing circuit in the remote sensing terminal processes the signals from the audio sensor and the image sensor to determine the relative delay between the sensed audio signal and the sensed images. The delay information is then communicated to the multimedia station to adjust the AV synchronization.

22 Claims, 5 Drawing Sheets

SYSTEM AND METHOD FOR AV SYNC CORRECTION BY REMOTE SENSING

RELATED APPLICATIONS

This application claims priority from U.S. Provisional Application 61/865,901 filed Aug. 14, 2013, and is also a Continuation in Part of U.S. application Ser. No. 11/598,870, filed Nov. 13, 2006 which is a Continuation in Part of PCT/US2005/041623, filed Nov. 16, 2005 which is a Continuation in Part of PCT/US2005/012588 filed on Apr. 13, 2005, and is also a Continuation in Part of U.S. application Ser. No. 10/846,133 filed May 14, 2004 and issued as U.S. Pat. No. 7,499,104 on Mar. 3, 2009, which claims priority from U.S. Provisional Application 60/471,176 filed May 16, 2003. The above applications are incorporated herein by reference as if set out herein in full detail.

BACKGROUND

The invention relates to the creation, manipulation, transmission, storage, etc. and in particular synchronization of multi-media entertainment, educational, surveillance and other programming having at least video and associated information. Such associated information includes audio, data and/or any other information which has a temporal relationship with the video. Generally the invention will be useful in any system or device in which it is desired that a timing relationship of two or more signals be maintained, measured, obtained and/or corrected and is particular useful with respect to image, audible and data signals with temporal timing relationships.

The creation, manipulation, transmission, storage, display etc. of multi-media entertainment, educational, surveillance and other programming having at least video and associated information is often preferred to have a degree of synchronization between the video portion and such associated information. Typical examples of such programming are television and movie programs. Often these programs include a visual or video portion, an audible or audio portion, and may also include one or more various data type portions, for one example data pertaining to a sales (e.g. cash register) or credit card terminal and the video from a surveillance camera viewing the device(s) generating such data. Typical data type portions include closed captioning, narrative descriptions for the blind, additional program origination, storage, transmission and information data for example such as web sites, financial and transactional data and further information directives, and various metadata included in compressed (e.g., MPEG and JPEG) systems.

Television programs having data, audio and video portions having temporal timing relationships will be used by way of example in respect to the description of the preferred embodiment of the invention. Often the video and associated signal programs are produced, operated on, stored or conveyed in a manner such that the synchronization of various ones of the aforementioned audio, video and/or data is affected. For example the synchronization of audio and video, commonly known as lip sync, may be askew when the program is produced. If the program is produced with correct lip sync, that timing may be upset by subsequent operations, for example such as processing, storing or transmission of the program. It is important to recognize that a television program which is produced with lip sync intact may have the lip sync subsequently upset. That upset may be corrected by analyzing the audio and video signal processing delay differential which causes such subsequent upset. If the television program is initially produced with lip sync in error the subsequent correction of that error is much more difficult but can be corrected with the invention. Both these problems and their solutions via the invention will be appreciated from the teachings herein.

One aspect of multi-media programming is maintaining audio and video synchronization in audio-visual presentations, such as television programs, for example to prevent annoyances to the viewers, to facilitate further operations with the program or to facilitate analysis of the program. Various approaches to this challenge are described in issued patents. U.S. Pat. No. 4,313,135, U.S. Pat. No. 4,665,431; U.S. Pat. No. 4,703,355; U.S. Pat. No. Re. 33,535; U.S. Pat. No. 5,202,761; U.S. Pat. No. 5,530,483; U.S. Pat. No. 5,550,594; U.S. Pat. No. 5,572,261; U.S. Pat. No. 5,675,388; U.S. Pat. No. 5,751,368; U.S. Pat. No. 5,920,842; U.S. Pat. No. 5,946,049; U.S. Pat. No. 6,098,046; U.S. Pat. No. 6,141,057; U.S. Pat. No. 6,330,033; U.S. Pat. No. 6,351,281; U.S. Pat. No. 6,392,707; U.S. Pat. No. 6,421,636, U.S. Pat. No. 6,469,741 and U.S. Pat. No. 6,989,869. Generally these patents deal with detecting, maintaining and correcting lip sync and other types of video and related signal synchronization.

U.S. Pat. No. 5,572,261 describes the use of actual mouth images in the video signal to predict what syllables are being spoken and compare that information to sounds in the associated audio signal to measure the relative synchronization. Unfortunately when there are no images of the mouth, there may be no ability to determine which syllables are being spoken.

As another example, in systems where there exists the ability to measure the relation between audio and video portions of programs, an audio signal may correspond to one or more of a plurality of video signals, and it is desired to determine which. For example in a television studio where each of three speakers wears a microphone and each actor has a corresponding camera which takes images of the speaker, it is desirable to correlate the audio programming to the video signals from the cameras. One use of such correlation is to automatically select (e.g. for transmission or recording) the camera which televises the actor which is currently speaking. As another example when a particular camera is selected it is useful to select the audio corresponding to that video signal. In yet another example, it is useful to inspect an output video signal, and determine which of a group of video signals it corresponds to thereby facilitating automatic selection or timing of the corresponding audio. Commonly assigned patents describing these types of systems are described in U.S. Pat. Nos. 5,530,483 and 5,751,368.

Generally, with the exception of U.S. Pat. Nos. 5,572,261, 5,530,483 and 5,751,368, the above patents describe operations without inspection or response to the video signal images. Consequently the applicability of the descriptions of the patents is limited to particular systems where various video timing information, etc. is utilized. U.S. Pat. Nos. 5,530,483 and 5,751,368 deal with measuring video delays and identifying video signal by inspection of the images carried in the video signal, but do not make any comparison or other inspection of video and audio signals. U.S. Pat. No. 5,572,261 teaches the use of actual mouth images in the video signal and sounds in the associated audio signal to measure the relative synchronization. U.S. Pat. No. 5,572,261 describes a mode of operation of detecting the occurrence of mouth sounds in both the lips and audio. For example, when the lips move to make a sound like an E and an E is present in the audio, the time relation between the occurrences of these two events is used as a measure of the relative delay there between. The description in U.S. Pat. No. 5,572,261 describes the use of a common attribute for example such as particular sounds made by the lips, which can be detected in both audio and video signals. The detection and correlation of visual moving of the lips corresponding to certain sounds and the audible presence of the corresponding sound is computationally intensive leading to high cost and complexity.

In a paper, J. Hershey, and J. R. Movellan ("Audio-Vision: Locating sounds via audio-visual synchrony" Advances in Neural Information Processing Systems 12, edited by S. A. Solla, T. K. Leen, K-R Muller. MIT Press, Cambridge, Mass. (MIT Press, Cambridge, Mass., (c) 2000)) it was recognized that sounds could be used to identify corresponding individual pixels in the video image. The correlation between the audio signal and individual ones of the pixels in the image were used to create movies that show the regions of the video that have high correlation with the audio. From the correlation data they estimate the centroid of image activity and use this to find the talking face. Hershey et al. described the ability to identify which of two speakers in a television image was speaking by correlating the sound and different parts of the face to detect synchronization. Hershey et al. noted, in particular, that "[i]t is interesting that the synchrony is shared by some parts, such as the eyes, that do not directly contribute to the sound, but contribute to the communication nonetheless." More particularly, Hershey et al. noted that these parts of the face, including the lips, contribute to the communication as well. There was no suggestion by Hershey and Movellan that their algorithms could measure synchronization or perform any of the other features of the invention. Again they specifically said that they do not directly contribute to the sound. In this reference, the algorithms merely identified who was speaking based on the movement or non movement of features.

In another paper, M. Slaney and M. Covell ("FaceSync: A linear operator for measuring synchronization of video facial images and audio tracks" available at www.slaney.org) described that Eigen Points could be used to identify lips of a speaker, whereas an algorithm by Yehia, Ruben, Batikiotis-Bateson could be used to operate on a corresponding audio signal to provide positions of the fiduciary points on the face. The similar lip fiduciary points from the image and fiduciary points from the Yehia algorithm were then used for a comparison to determine lip sync. Slaney and Covell went on to describe optimizing this comparison in "an optimal linear detector, equivalent to a Wiener filter, which combines the information from all the pixels to measure audio-video synchronization." Of particular note, "information from all of the pixels was used" in the FaceSync algorithm, thus decreasing the efficiency by taking information from clearly unrelated pixels. Further, the algorithm required the use of training to specific known face images, and was further described as "dependent on both training and testing data sizes." Additionally, while Slaney and Covell provided mathematical explanation of their algorithm, they did not reveal any practical manner to implement or operate the algorithm to accomplish the lip sync measurement. Importantly the Slaney and Covell approach relied on fiduciary points on the face, such as corners of the mouth and points on the lips.

Also, U.S. Pat. No. 5,387,943 of Silver, a method is described the requirements that the mouth be identified by an operator. And, like U.S. Pat. No. 5,572,261 discussed above, utilizes video lip movements. In both of these references, only the mere lip movement is focused on. No other characteristic of the lips or other facial features, such as the shape of the lips, is considered in either of these disclosed methods. In particular, the spatial lip shape is not detected or considered in either of these references. Rather, only the movement and whether the lips are opened or closed are discussed.

In the U.S. application Ser. No. 11/598,870, filed on Nov. 13, 2006 by the inventor, a method is described for directly comparing images conveyed in the video portion of a signal to characteristics in an associated signal, such as an audio signal. The invention considers the shape and movement of the lips, providing substantially improved accuracy of audio and video synchronization of spoken words by video characters. Furthermore, the invention provides a method for determining different spoken sounds by determining whether teeth are present between the open lips, such as when the letters "v" or "s", for example, are pronounced. A system configured according to the invention can thus reduce or remove one or more of the effects of different speaker related voice characteristics The term Audio and Video MuEv (ref U.S. Pat. No. 7,499,104, Publication 20040227856) is introduced by the inventor. MuEv is the contraction of Mutual Event, to mean an event occurring in an image, signal or data which is unique enough that it may be accompanied by another MuEv in an associated signal. Such two MuEvs are, for example, Audio and Video MuEv-s, where certain video quality (or sequence) corresponds to a unique and matching audio event. One simple example of audio and video MuEvs are the crack of a baseball bat hitting a ball (the audio MuEv) and the instant change of direction of the ball (the video MuEv). Because both happen at the same instant, they can be utilized to determine any subsequent mistiming of audio and video.

This may be done for faces and speech by first acquiring Audio and Video MuEvs from input audio-video signals, and using them to calibrate an audio video synchronization system. The MuEv acquisition and calibration phase is followed by analyzing the audio information, and analyzing the video information. From this Audio MuEvs and Video MuEvs are calculated from the audio and video information, and the audio and video information is classified into vowel sounds including, but not limited to, AA, EE, OO (capital double letters signifying the sounds of vowels a, e and o respectively), letters "s", "v", "z" and "f" i.e. closed mouth shapes when teeth are present, letters "p", "b", "m", i.e. closed mouth shapes where teeth are not present, silence, and other unclassified phonemes. This information is used to determine and associate a dominant audio class with one or more corresponding video frames. Matching locations are determined, and the offset of video and audio is determined. A simply explained example is that the sound EE (an audio MuEv) may be identified as occurring in the audio information and matched to a corresponding image characteristic like lips forming a shape associated with speaking the vowel EE (a video MuEv) with the relative timing thereof being measured or otherwise utilized to determine or correct a lip sync error.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION

Figure 1:
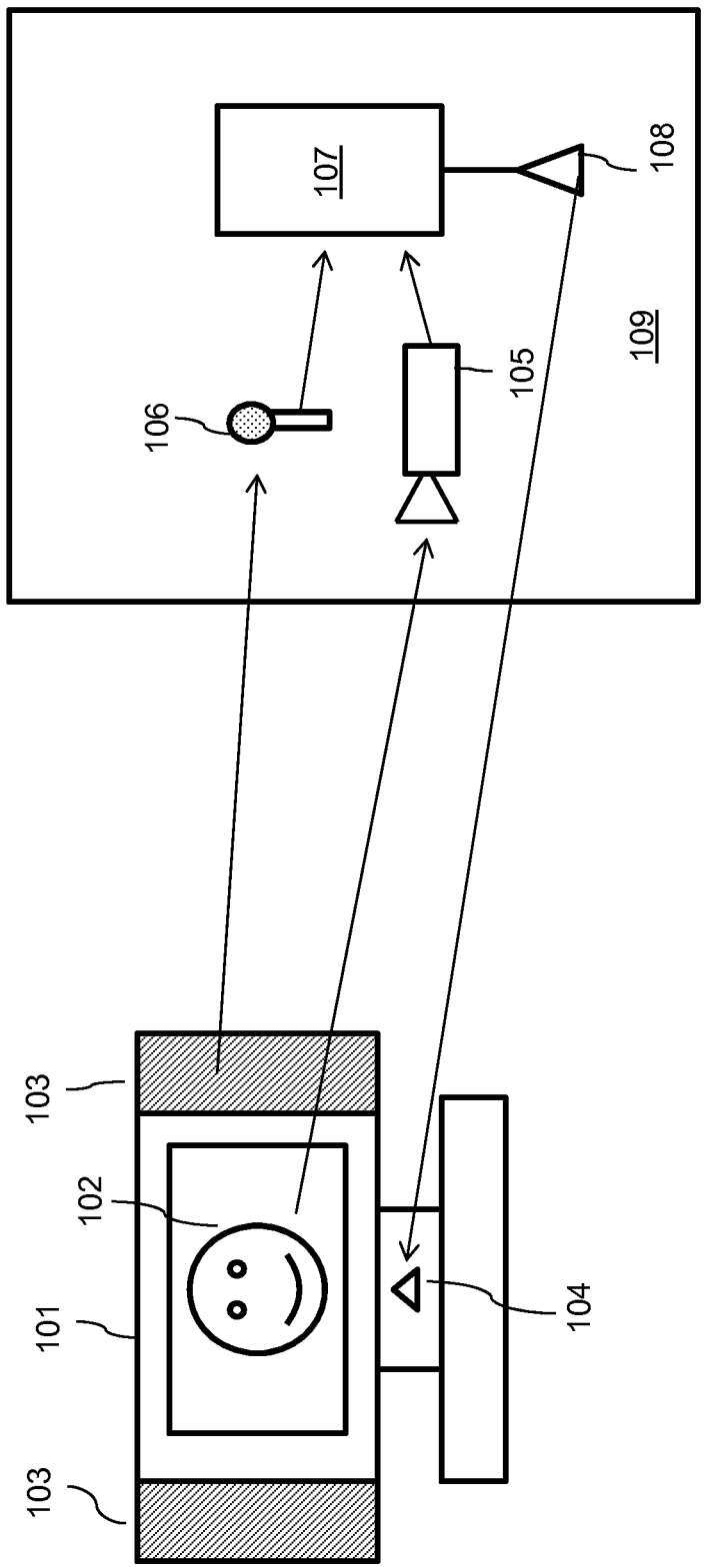
FIG. 1 shows a preferred embodiment of the present invention as used with a multimedia terminal and a remote sensing station.

Audio to Video synchronization or AV Sync is a pervasive problem in modern information and entertainment systems. The chain of program production, editing, transmission, storage, distribution, display, etc. creates numerous and substantial amounts of processing of audio and video portions of the program, which potentially lead to AV Sync problems.

The present invention allows for the correction of AV Sync problems at the final point in the production/transmission/display chain, i.e. at the point where the viewer experiences the program. It can also be used at any point in the chain where it is desired to verify, measure and/or correct AV sync errors.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows a multimedia terminal 101 with corresponding audio transducer(s) 103 as are well known in the art. The video display displays an image 102, and the audio transducer(s) 103 provide sound, of a television program as are well known in the art. The television program may be provided by any means as is well known. For example, the most popular TV delivery means today are by broadcasting via terrestrial, satellite, and cable. Other means such as internet or video disk are also widely used to provide television programs. The multimedia terminal 101 also contains a communications port 104 such as a receiving transducer, which port may provide unidirectional (i.e. receive only) or bidirectional (transmit and receive) operation. For example the terminal communication port 104 may be an optical or electronic connector, antenna, inductive coil, phototransistor, photo emitter, photocell, LED, microphone, speaker, piezoelectric element, MEMS element or other transducer or combination of transducers to facilitate communications as described further below. The terminal communication port 104 may be utilized for remote control communications for example.

FIG. 1 also shows a remote sensing station 109 consisting of an image sensor 105, audio sensor 106, AV processing circuit 107 and communications port 108. Audio sensor 106 may be any well known sound sensing transducer for example such as a dynamic, electrostatic or MEMS microphone and image sensor 105 may be any well known image sensing transducer for example such as a CCD or CMOS television camera sensor array. AV processing circuit 107 operates to receive audio and video signals from the audio sensor 106 and the image sensor 105 respectively and determine the relative timing of sound and images thereof. The relative delay of sound and images is then communicated back to multimedia terminal 101 via communications ports 108 and 104 where it is used by multimedia terminal 101 to delay the earlier of the sound and image to ensure proper timing thereof at the location of the image sensor 105 and the audio sensor 106.

The communications may be bidirectional. For example it is preferred that multimedia terminal 101 communicates with the remote sensing station 109 to provide confidence that the remote sensing station 109 is operating and multimedia terminal 101 is receiving AV timing information from the remote sensing station 109. Also it is desired that the remote sensing station 109 is able to display to a user (for example via an LCD screen) that it is communicating with the multimedia terminal 101. The communications may be via wired, wireless (RF), wireless (magnetic), wireless (optical) or any other suitable means.

If desired all or part of the remote sensing station 109 may be incorporated in the multimedia terminal 101 or the audio transducer 103. In particular, only the image sensor 105 or the audio sensor 106 may be remotely located with the sound or image being taken directly from the multimedia terminal 101 (or the audio transducer 103) and coupled to the AV processing circuit 107. Such coupling may be via the terminal communication port 104 and the remote communication port 108. Of course when sound and/or images are taken directly from the multimedia terminal 101, that will lessen or eliminate the need for the audio sensor 106 and/or the image sensor 105 respectively, depending on where in the multimedia terminal 101 the sound and/or image is taken for application to the AV processing circuit 107.

The AV processing circuit 107 may be any suitable circuit or means for determining the timing between audio and image, such as that described in the LipTracker applications.

The image 102 and sound (from the audio transducer 103) which is utilized by the AV processing circuit 107 (via the image sensor 105 and the audio sensor 106 or directly from the multimedia terminal 101) is preferred to be the current program image and sound, thus allowing complete correction for the AV timing of the current television program.

Alternatively, correction may be made for AV timing errors resulting from the multimedia terminal 101 and/or the audio transducer 103 by causing test signals to be generated in the multimedia terminal 101 and/or the audio transducer 103 with the timing thereof being sensed and computed by the remote sensing station 109.

Measurement and/or correction of AV timing errors may be performed on demand of the user, on a repeating basis for example in response to a timer or programming event, or continuously as desired.

The AV processing circuit 107 may be incorporated in the multimedia terminal 101 or elsewhere with the audio and image signals from the audio sensor 106 and the image sensor 105 respectively being coupled back to the AV processing circuit 107 (located in the multimedia terminal 101 or elsewhere) via communications link(s). The image sensor 105, the audio sensor 106, the AV processing circuit 107 and/or the remote communication port 108 may be incorporated in or shared with other devices or methods. Various combinations of locations of and communications with the image sensor 105, the audio sensor 106, the AV processing circuit 107 and the remote communication port 108 may be resorted to in order to practice the invention with a particular multimedia terminal 101 in a desired environment as will be known to the person of ordinary skill from the teachings herein without departing from the scope and intent of the invention as claimed.

Figure 2:
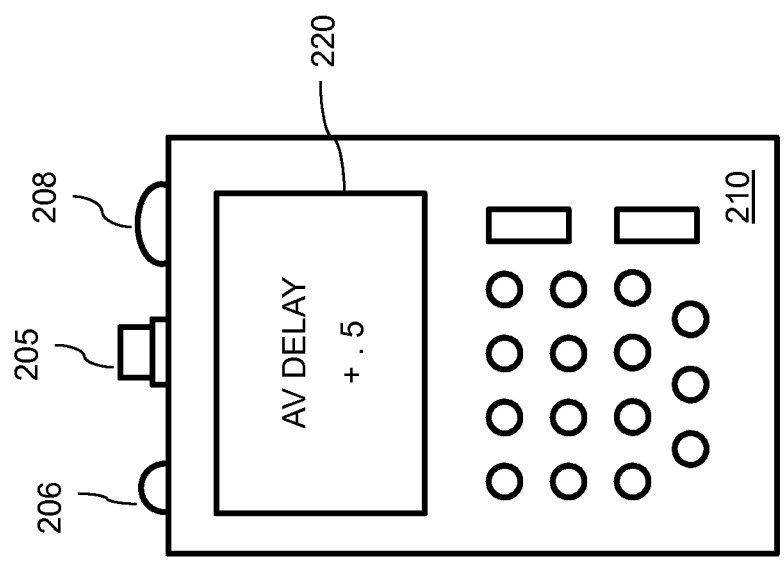
FIG. 2 shows an alternative embodiment of the invention by incorporating the remote sensing station inside a remote control.

As shown in FIG. 2 it is desirable that the remote sensing station 109 be incorporated within (not shown) the remote control 210. It is desired that the remote sensing station 109 shares the communications port 208 (photo transistor and LED) for bidirectional communications, microprocessor (not shown) and LCD display 220 of the remote control 210, with an image sensor 205 and audio sensor 206 also being added to the remote control. In this manner the AV delay of the image and audio at the remote control location can be measured and displayed to the user on the LCD display 220 if desired, as well as being communicated back to the multimedia terminal 101 to allow for the delay of the earlier arriving of the image or sound to be delayed by the measured amount, thus correcting for the AV sync error. It is preferred that measurement, communications and/or correction may be automatic, or by user command as is desired by the user. Alternatively, measurement, communications and correction may be automatic without user interaction.

Again, various combinations of locations of and communications with the image sensor, the audio sensor, the AV processing circuit and the remote communication port may be resorted to in order to practice the invention with a particular multimedia terminal in a desired environment as will be known to the person of ordinary skill from the teachings herein without departing from the scope and intent of the invention as claimed. In particular, when the image sensor 205 and the audio sensor 206 are incorporated within the remote control 210, in some applications it may be desired that the AV processing circuit 107 be incorporated in the multimedia terminal 101 with only the image and sound MuEv information from the image sensor 205 and the audio sensor 206 being communicated to the AV processing circuit 107 via the remote communication port 108 and the terminal communication port 104. The AV sync error is determined by the AV processing circuit 107 and coupled to the multimedia terminal 101 for correction. If desired the AV sync error may be coupled via the terminal communication port 104 and the remote communication port 108 to the remote control 109 where it is available for display to the user either upon user command or automatically.

Alternatively, the remote sensing station 109 may be a stand alone device which may be placed at or near the viewer's location in order to facilitate the viewing of the television program with proper AV sync.

By placing the image sensor 105 and/or the audio sensor 106 at or near the viewer's location, optimum measurement and correction of AV sync is achieved. In this fashion it is ensured that not only the timing errors already present in the television program received by the multimedia terminal 101 are corrected, but any additional errors introduced by the multimedia terminal 101 (and/or the audio transducer 103) as well as the error introduced by the delay of sound traveling from the audio transducer 103 to the viewer are corrected. It is noted that because light travels from the multimedia terminal 101 to the viewer virtually instantly, whereas sound travels much slower, there is little advantage to having the image sensor 105 located at the viewer's location whereas there is an advantage to having the audio sensor 106 at the viewer's location. This assumes however that any delays in the image 102 which are created by the multimedia terminal 101 are accounted for.

Figure 3:
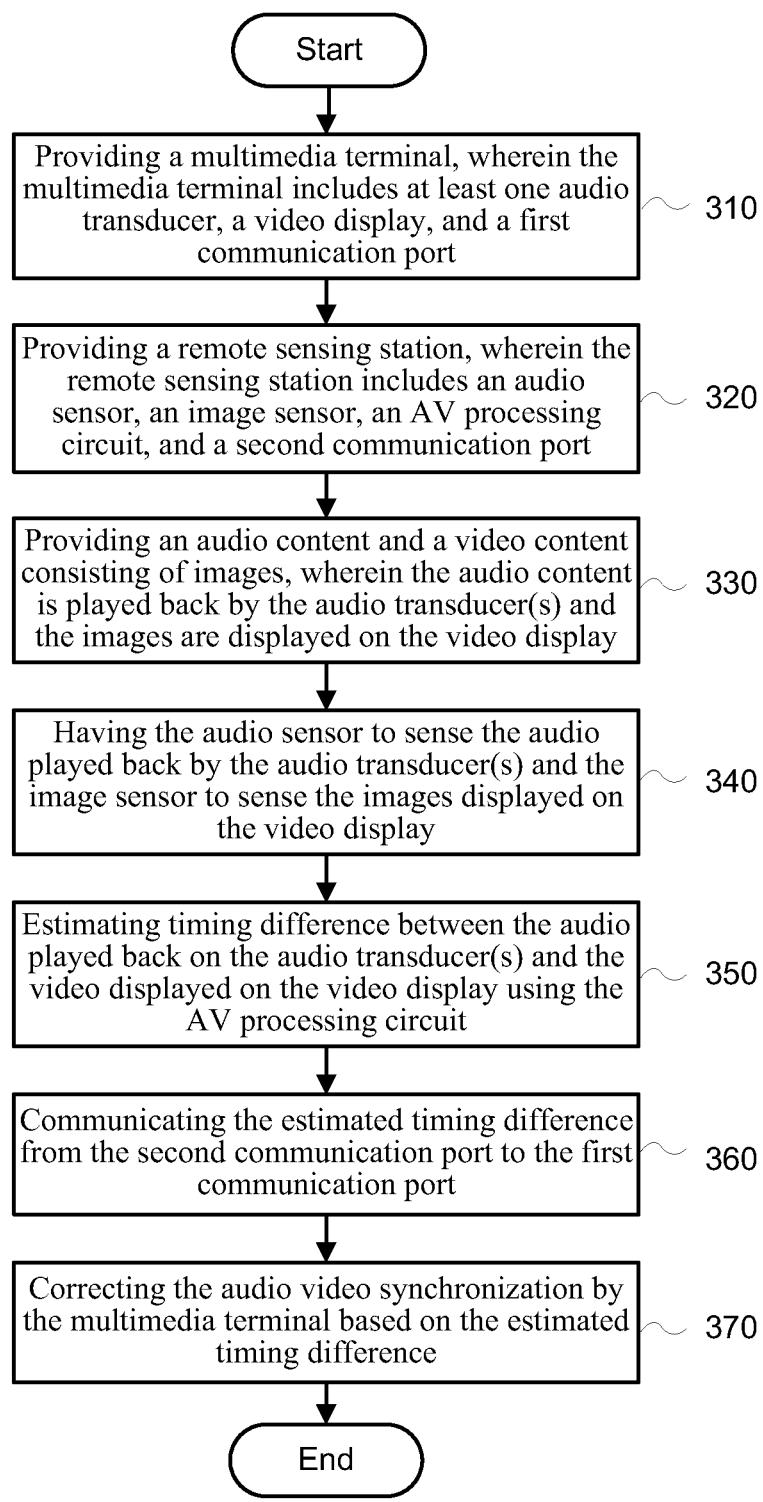
FIG. 3 is a flow chart of AV sync correction method by processing the audio received by audio sensor and images received by image sensor.

FIG. 3 shows a flow chart of AV sync correction method by processing the audio received by audio sensor and images received by image sensor. In step 310, a multimedia terminal is provided, wherein the multimedia terminal includes at least one audio transducer, a video display, and a first communication port. In step 320, a remote sensing station is provided, wherein the remote sensing station includes an audio sensor, an image sensor, an AV processing circuit, and a second communication port. In step 330, an audio content and a video content consisting of images are provided, wherein the audio content is played back by the audio transducer(s) and the images are displayed on the video display. In step 340, the audio played back by the audio transducer(s) is sensed by the audio sensor to sense and the images displayed on the video display are sensed by the image sensor. In step 350, the timing difference between the audio played back on the audio transducer(s) and the video displayed on the video display is estimated or measured by the AV processing circuit. In step 360, the measured timing difference is transmitted from the second communication port at the remote sensing station to the first communication port at the multimedia terminal. In step 370, the audio video synchronization is corrected by the multimedia terminal based on the measured timing difference. In the step 350, AV processing circuit measures the timing difference between the audio and image based on the audio received from audio sensor and images received from image sensor. The method used by the AV processing circuit can be any method that will be able to measure the AV timing such as the method described in U.S. application Ser. No. 11/598,870.

Figure 4:
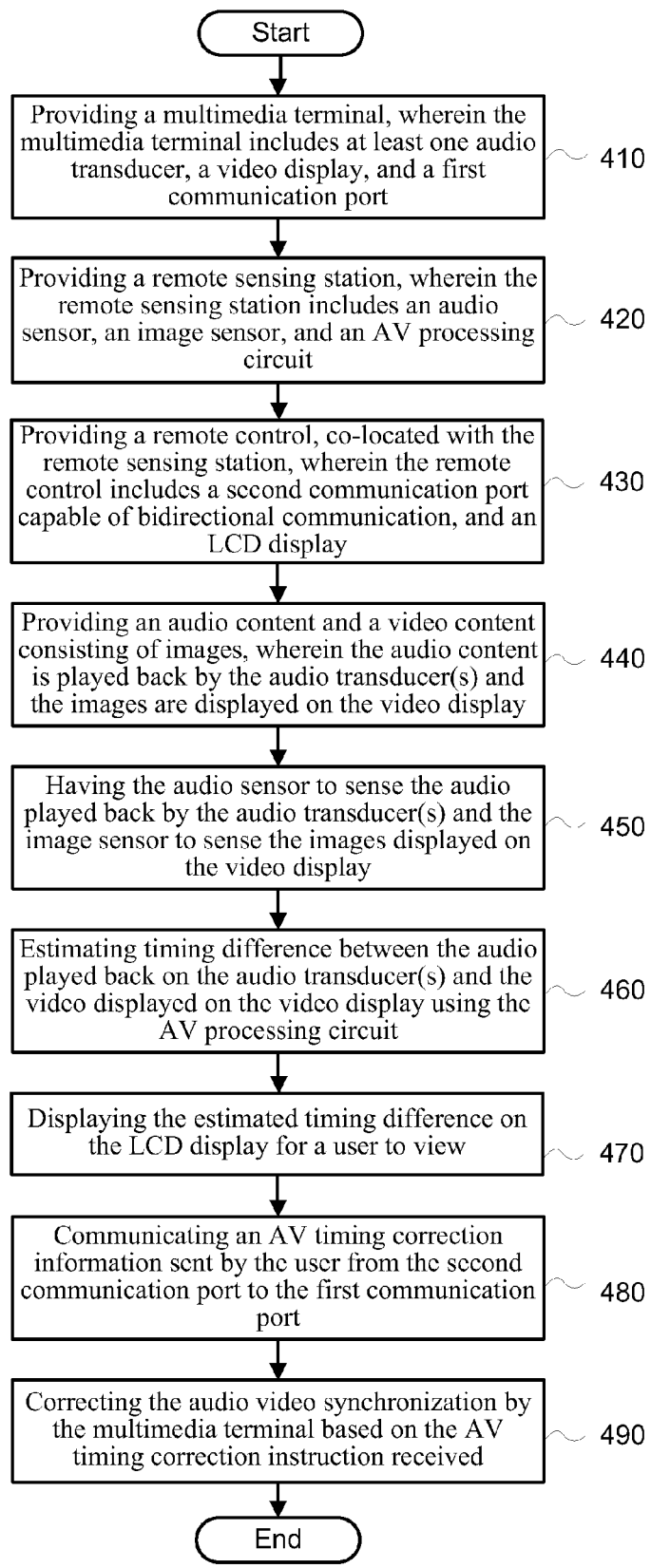
FIG. 4 is a flow chart of AV sync correction method by processing the audio received by audio sensor and images received by image sensor and utilizing a remote control with an LCD display.
Figure 5:
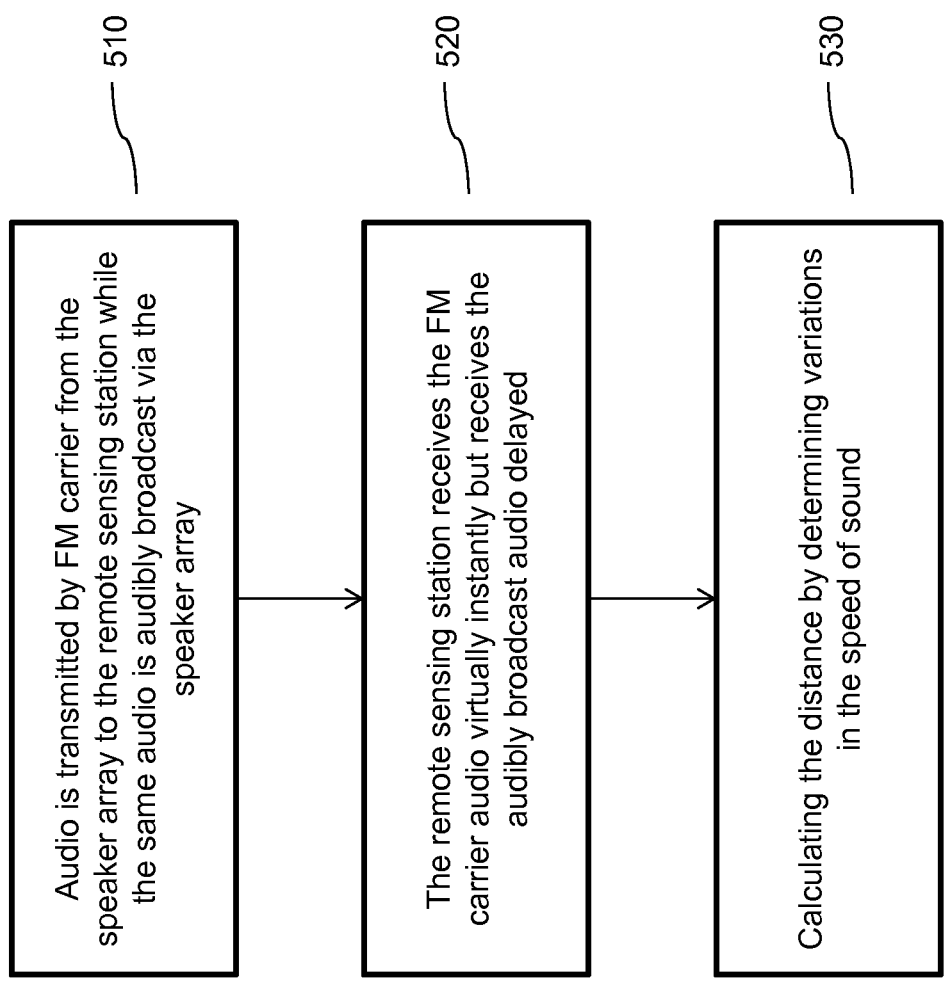
FIG. 5 is a flow chart of a method for measuring the delay between the quickly transmitted sound and the same sound arriving at the remote sensing station via the atmosphere.

FIG. 4 shows flow chart of AV sync correction method by processing the audio received by audio sensor and images received by image sensor and utilizing a remote control with an LCD display. In step 410, a multimedia terminal is provided, wherein the multimedia terminal includes at least one audio transducer, a video display, and a first communication port. In step 420, a remote sensing station is provided, wherein the remote sensing station includes an audio sensor, an image sensor, an AV processing circuit, and a second communication port. In step 430, a remote control, co-located with the remote sensing station, is provided wherein the remote control includes a second communication port capable of bidirectional communication, and an LCD display. In step 440, an audio content and a video content consisting of images are provided, wherein the audio content is played back by the audio transducer(s) and the images are displayed on the video display. In step 450, the audio played back by the audio transducer(s) is sensed by the audio sensor to sense and the images displayed on the video display are sensed by the image sensor. In step 460, the timing difference between the audio played back on the audio transducer(s) and the video displayed on the video display is measured by the AV processing circuit. In step 470, the measured timing difference is displayed on the LCD display for a user to view In step 480, an AV timing correction information sent by the user is transmitted from the second communication port at the remote control to the first communication port at the multimedia terminal. In step 490, the audio video synchronization is corrected by the multimedia terminal based on the AV timing correction instruction received FIG. 5 is a flow chart of a method for measuring the delay between the quickly transmitted sound and the same sound arriving at the remote sensing station via the atmosphere. This method will find considerable use in determining delays of each of multiple speakers which are located at distances found in outdoor events, e.g. concerts, etc. and useful in setting individual electronic audio delays for the sound sent to one or more of those speakers in order to minimize one or both of lip sync errors of the sound relative to the video and echoes perceived by viewers because they receive sound from more than one speaker. The timing of the audio signal sent to the speaker(s) may be changed during performances to compensate for changing sound propagation through atmosphere. Of course there is a tradeoff in that for a given viewer location it is desired to have sound from all speakers arrive at the same time and in sync with the video, however the invention will be useful for improving the ability to set compromise delays to achieve suitably matched video and sound for multiple locations.

While these methods mentioned above address the audio and video synchronization based on the source multimedia signals or the processed multimedia signals, there is a need and benefit to achieve audio and video synchronization based on the presented multimedia signals. In most cases, a multimedia signal will be eventually viewed by users on a presentation terminal such as a television set, a personal computer, a portable media player, and any device capable of displaying images and reproducing audio. Therefore, an audio and video synchronization based on the presented multimedia signals will be more direct and universal to overcome the AV synchronization problem. Furthermore, it can be made interactive to provide the viewer the capability to adjust relative AV delay in order to achieve AV synchronization.

The shortcomings of the prior art may be eliminated by the method, system, and program product described herein.

The preferred embodiment of the present invention provides a means to determine the delay between the audio and video of a television program or a multimedia signal presented on a multimedia terminal by using a remote sensing station. The invention is directed in one embodiment to use an audio sensor to sense the audio played from the audio transducer of the terminal and to use image sensor to sense the image displayed on video display of the terminal. The received audio and video signals are then processed by an AV processing circuit to determine the relative timing of the sound and images thereof. The relative delay in the audio/video is then determined and communicated through a communication port to the multimedia terminal for the terminal to adjust the relative timing of the audio and video signals.

It is noted that if the remote terminal is positioned at or near the viewer's location, the delay of sound as it passes through the atmosphere from the multimedia terminal to the viewer will be included in the measurement. This delay can be compensated for (for example by measuring the distance and calculating the delay of the sound through the atmosphere) to give the relative timing at the multimedia terminal. This compensation be omitted if it is desired to measure the timing of audio and video at the viewer's location. Utilizing viewer location timing is very useful where distances between the multimedia terminal and the viewer is significant, for example such as an outdoor event where the viewer is several hundred feet away.

The communication between the remote sensing station and the multimedia terminal can be a one-way means from the remote sensing station to the multimedia terminal or a two-way means so that the multimedia terminal can also send back information to the remote station. The information from the multimedia terminal to the remote station can be used to provide confidence.

Utilizing two way communication can provide a measure of the distance between the multimedia terminal to the remote sensing station by quickly (e.g. electronically or optically) transmitting sound (or partial sound such as MuEvs) directly from the multimedia terminal to the remote sensing station. The remote sensing station may then measure the delay between the quickly transmitted sound and the same sound arriving at the remote sensing station via the atmosphere. Because the propagation speed of sound through the atmosphere is known, the distance which provides the measured sound delay, corresponding to the distance between the multimedia terminal and the remote sensing station, can be computed.

By way of example of one embodiment of this feature, referring to FIG. 5, a large screen television display including a speaker array is located at one end of a sports stadium. In step 510, audio is transmitted electronically by FM carrier from the speaker array to the remote sensing station while the same audio is audibly broadcast via the speaker array. In step 520, the remote sensing station receives the FM carrier audio virtually instantly but receives the audibly broadcast audio delayed, the amount of which delay depends on the distance the remote sensing station is from the speaker array. In step 530, because sound travels at a nominal 1087 feet per second in air, the distance is readily calculated by determining variations in the speed of sound. This may be determined by including sensors (e.g. temperature, barometric pressure, altitude) for parameters which affect the speed of sound in the remote sensor and/or multimedia terminal to achieve a desired accuracy. Of course the invention may be utilized for measuring distance in other mediums as well, for example water as long as the speed of sound in that medium is known.

The distance measurement is a very useful feature for aligning multiple speaker arrays in large venues, for example to minimize echoes while at the same time minimizing lip sync errors.

In an alternative embodiment of the invention, the complete remote sensing station is incorporated inside the multimedia terminal. The audio sensor and image sensor may be incorporated with or on the terminal or can be eliminated since the AV processing circuit may obtain the needed audio and video information directly from the co-located multimedia terminal.

In another alternative embodiment of the invention, only the audio sensor and/or the image sensor are/is incorporated with the multimedia terminal and the sound and/or image being taken directly from the multimedia terminal and coupled to the AV processing circuit. Such coupling may be via communication port on the multimedia terminal and the remote sensing station. When sound and/or images are/is taken directly from the multimedia terminal, that will lessen or eliminate the need for audio sensor and/or image sensor respectively, depending on where in multimedia terminal the sound and/or image is taken for application to remote sensing station.

In yet another alternative embodiment, the remote sensing station can be incorporated within a remote control. It is desired that the remote sensing station can share the communications port with the remote control such as electromagnetic, infrared transceiver, photo transistor and LED for bidirectional communications, microprocessor and LCD display of the remote control, with a camera (as the image sensor) and microphone (as the audio sensor) also being added to the remote control. In this manner the AV delay of the image and audio at the remote control location can be measured and displayed to the user on the remote control LCD display if desired, as well as being communicated back to the multimedia terminal to allow for the delay of the earlier arriving of the image or sound to be delayed by the measured amount, thus correcting for the AV sync error. Because the remote control is often kept near the user's location the AV sync error may be minimized at that location as previously described. It is preferred that measurement, communications and/or correction may be automatic, or by user command as is desired by the user. Alternatively, measurement, communications and correction may be automatic without user interaction While the preferred embodiments of the current invention are disclosed, there are various combinations that a person with ordinary skill in the field may arrange to achieve the same goal. For example, various combinations of locations of and communications with remote sensing, audio sensor, image sensor, AV processing circuit, and communication port may be resorted to in order to practice the invention with a particular multimedia terminal in a desired environment as will be known to the person of ordinary skill from the teachings herein without departing from the scope and intent of the invention as claimed. In particular, when the audio sensor and the image sensor are incorporated within the remote sensing station, in some applications it is desired that AV processing circuit be incorporated in the multimedia terminal with only the image and sound MuEv information from the audio sensor and image sensor being communicated to the AV processing circuit via communication ports on the multimedia terminal and the remote sensing station. The AV sync error is determined by AV processing circuit and coupled to the multimedia terminal for correction. If desired the AV sync error may be coupled via communication ports to the remote control where it is available for display to the user either upon user command or automatically.

The invention claimed is:

1. A method for correcting audio video synchronization for a multimedia terminal, where provided are a multimedia terminal, wherein the multimedia terminal includes at least one audio transducer, a video display, and a first communication port; a remote sensing station, wherein the remote sensing station includes an audio sensor, an image sensor, an AV processing circuit, and a second communication port; an audio content and a video content consisting of images, wherein the audio content is played back by the audio transducer(s) and the images are displayed on the video display; said method comprising the steps of:

Sensing audible audio sound played back on a multimedia terminal transducer and sensing visible video images displayed on said multimedia terminal video display with an audio sensor and a video sensor respectively;

in response to sound sensed by said audio sensor and images sensed by said video sensor, measuring a lip sync timing difference between the audio played back on the audio transducer(s) and the video displayed on the video display using the AV processing circuit; communicating the timing difference from said AV processing circuit to said multimedia terminal via communications ports;

correcting the audio video synchronization of the audio sound and video images provided by the multimedia terminal based on said measured timing difference.

2. A method for correcting audio video synchronization for a multimedia terminal as in claim 1, wherein the audio sensor of the remote sensing station is located inside the multimedia terminal.

3. A method for correcting audio video synchronization for a multimedia terminal as in claim 1, wherein the image sensor of the remote sensing station is located inside the multimedia terminal.

4. A method for correcting audio video synchronization for a multimedia terminal as in claim 1, wherein the audio sensor and the image sensor of the remote sensing station are located inside the multimedia terminal.

5. A method for correcting audio video synchronization for a multimedia terminal as in claim 1, wherein the first communication port and the second communication port are bi-directional.

6. A method for correcting audio video synchronization for a multimedia terminal as in claim 1, wherein the AV processing circuit detects audio MuEv's from the audio sensed by the audio sensor, detects video MuEv's from the images sensed by the image sensor, and estimates the timing difference based on the audio MuEv's and the video MuEv's.

7. A method for correcting audio video synchronization for a multimedia terminal, where provided are a multimedia terminal, wherein the multimedia terminal includes at least one audio transducer, a video display, and a first communication port; a remote sensing station, wherein the remote sensing station includes an audio sensor, an image sensor, an AV processing circuit, and a second communication port; an audio content and a video content consisting of images, wherein the audio content is played back by the audio transducer(s) and the images are displayed on the video display; said method comprising the steps of:
  sensing the audible audio sounds played back by the audio transducer(s) and the image sensor to sense the visible images displayed on the video display;
  in response to said sensing measuring timing difference between the audio played back on the audio transducer(s) and the video displayed on the video display using the AV processing circuit;
  displaying the measured timing difference on an LCD display for a user to view;
  communicating an AV timing correction information sent by the user from a second communication port to a first communication port; and
  correcting the audio video synchronization of the multimedia terminal based on the AV timing correction instruction received.

8. A method for correcting audio video synchronization for a multimedia terminal as in claim 7, wherein the first communication port is bi-directional.

9. A method for correcting audio video synchronization for a multimedia terminal as in claim 7, wherein the AV processing circuit detects audio MuEv's from the audio sensed by the audio sensor, detects video MuEv's from the images sensed by the image sensor, and estimates the timing difference based on the audio MuEv's and the video MuEv's.

10. A method for correcting audio video synchronization for a multimedia terminal as in claim 7, wherein the AV timing correction information includes an AV timing adjustment amount.

11. A method for correcting audio video synchronization for a multimedia terminal as in claim 7, wherein the AV timing correction information includes the timing difference measured and an instruction for the multimedia terminal to correct the audio video synchronization automatically.

12. A system for correcting audio video synchronization, comprising:
  a multimedia terminal for displaying a multimedia content including at least one audio transducer, a video display, and a first communication port, wherein the multimedia content containing an audio content and a video content consisting of images, the audio content is played back by the audio transducer(s) and the images are displayed on the video display; and
  a remote sensing station including an audio sensor, an image sensor, an AV processing circuit, and a second communication port, wherein the audio sensor senses the audible audio sound played back by the audio transducer(s), the image sensor senses the visible images displayed on the video display, the AV processing circuit measures a timing difference between the audible audio sound played back on the audio transducer(s) and the visible video displayed on the video display;
  wherein the remote sensing station communicates the measured timing difference from the second communication port to the first communication port; and
  the multimedia terminal corrects the audio video synchronization of the visible displayed images and audible audio sound based on the measured timing difference.

13. A system for correcting audio video synchronization as in claim 12, wherein the audio sensor of the remote sensing station is located inside the multimedia terminal.

14. A system for correcting audio video synchronization as in claim 12, wherein the image sensor of the remote sensing station is located inside the multimedia terminal.

15. A method for correcting audio video synchronization for a multimedia terminal as in claim 1, wherein the audio sensor and the image sensor of the remote sensing station are located inside the multimedia terminal.

16. A system for correcting audio video synchronization as in claim 12, wherein the first communication port and the second communication port are bi-directional.

17. A system for correcting audio video synchronization as in claim 12, wherein the AV processing circuit detects audio MuEv's from the audio sensed by the audio sensor, detects video MuEv's from the images sensed by the image sensor, and estimates the timing difference based on the audio MuEv's and the video MuEv's.

18. A system for correcting audio video synchronization, comprising:
  a multimedia terminal for displaying a multimedia content including at least one audio transducer, a video display, and a first communication port, wherein the multimedia content containing an audio content and a video content consisting of images, the audio content is audibly played back by the audio transducer(s) and the images are visibly displayed on the video display;
  a remote sensing station including an audio sensor, an image sensor, and an AV processing circuit, wherein the audio sensor senses the audible audio played back by the audio transducer(s), the image sensor senses the visible images displayed on the video display, the AV processing circuit estimates timing difference between the audio played back on the audio transducer(s) and the video displayed on the video display; and a remote control, co-located with the remote sensing station, wherein the remote control includes a second communication port capable of bidirectional communication, and an LCD display;

wherein the timing difference measured is displayed on the LCD for a user to view;

receiving AV timing correction information from the second communication port to the first communication port; and the multimedia terminal corrects the audio video synchronization based on the AV timing correction information received.

19. A system for correcting audio video synchronization as in claim 18, wherein the AV processing circuit detects audio MuEv's from the audio sensed by the audio sensor, detects video MuEv's from the images sensed by the image sensor, and estimates the timing difference based on the audio MuEv's and the video MuEv's.

20. A system for correcting audio video synchronization as in claim 18, wherein the AV timing correction information includes an AV timing adjustment amount.

21. A system for correcting audio video synchronization as in claim 18, wherein the AV timing correction information includes the timing difference measured and an instruction for the multimedia terminal to correct the AV timing automatically.

22. A system for correcting audio video synchronization as in claim 18, wherein the first communication port is bi-directional.

* * * * *